United States Patent
Christiansen et al.

(10) Patent No.: US 10,448,753 B2
(45) Date of Patent: Oct. 22, 2019

(54) INSULATED GLASS UNIT

(71) Applicant: CORNING INCORPORATED, Corning, NY (US)

(72) Inventors: Kirk Wegner Christiansen, Horseheads, NY (US); Dan Owewn Harris, Hickory, NC (US); Tak Lap Derek Law, Horseheads, NY (US); Daniel Louis Gabriel Ricoult, Bourron-Marlotte (FR); Mark J Soulliere, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 108 days.

(21) Appl. No.: 15/318,495

(22) PCT Filed: Jun. 26, 2015

(86) PCT No.: PCT/US2015/037976
§ 371 (c)(1),
(2) Date: Dec. 13, 2016

(87) PCT Pub. No.: WO2015/200793
PCT Pub. Date: Dec. 30, 2015

(65) Prior Publication Data
US 2017/0119176 A1 May 4, 2017

Related U.S. Application Data

(60) Provisional application No. 62/017,547, filed on Jun. 26, 2014, provisional application No. 62/073,059, filed on Oct. 31, 2014.

(51) Int. Cl.
*A47F 3/04* (2006.01)
*E06B 3/67* (2006.01)
(Continued)

(52) U.S. Cl.
CPC .......... *A47F 3/0434* (2013.01); *E06B 3/6715* (2013.01); *E06B 7/28* (2013.01); *E06B 3/66366* (2013.01); *Y02B 80/24* (2013.01)

(58) Field of Classification Search
CPC ...... E06B 3/66; E06B 3/6715; E06B 3/66366; Y02B 80/22; A47F 3/0434
See application file for complete search history.

(56) References Cited

U.S. PATENT DOCUMENTS 2,002,322 A 5/1935 Kraemer
3,553,913 A * 1/1971 Eisenberg ............. E06B 3/6621
52/172

(Continued)

FOREIGN PATENT DOCUMENTS

JP 2003125904 5/2003
JP 2011242094 12/2011

(Continued)

OTHER PUBLICATIONS

Robert Hart et al., "Reducing Window Heat Loss: Using thin glass as a non-structural center-layer", Windows and Daylight Research Group, Lawrence Berkeley National Laboratory, Sep. 30, 2010.

(Continued)

*Primary Examiner* — Donald J Loney

(57) ABSTRACT

An insulated glass unit (20) is described and includes at least first and second glass pane (22, 32) and an optional third glass pane (42). Any one or more of the glass panes (22, 32, 42) may have a thickness of less than or equal to about 0.7 mm. In some instances, any one or more of the glass panes may form part of an electronic display. The insulated glass unit (20) has a lower mass and an improved thermal performance compared to a conventional triple pane insulated glass unit, and is particularly suited for use in a display cooler door.

17 Claims, 6 Drawing Sheets

(51) Int. Cl.
*E06B 7/28* (2006.01)
*E06B 3/663* (2006.01)

(56) References Cited

U.S. PATENT DOCUMENTS

| | | | |
|---|---|---|---|
| 4,671,582 A | 6/1987 | Stromquist et al. | |
| 4,893,902 A | 1/1990 | Baughman et al. | |
| 5,116,274 A | 5/1992 | Artwohl et al. | |
| 5,255,473 A | 10/1993 | Kaspar et al. | |
| 5,270,843 A | 12/1993 | Wang | |
| 5,645,330 A | 7/1997 | Artwohl et al. | |
| 6,005,652 A | 12/1999 | Matsuhira | |
| 6,148,563 A | 11/2000 | Roche et al. | |
| 6,196,026 B1 * | 3/2001 | Anderson | B01L 3/5085 65/44 |
| 6,377,228 B1 | 4/2002 | Jenkin et al. | |
| 6,401,399 B1 | 6/2002 | Roche et al. | |
| 6,427,772 B1 | 8/2002 | Oden et al. | |
| 6,476,885 B1 | 11/2002 | Murray et al. | |
| 6,606,832 B2 | 8/2003 | Richardson et al. | |
| 7,072,096 B2 | 7/2006 | Holman et al. | |
| 7,824,056 B2 | 11/2010 | Madireddi et al. | |
| 7,919,158 B2 | 4/2011 | Seth et al. | |
| 8,007,913 B2 | 8/2011 | Coppola et al. | |
| 8,683,745 B2 | 4/2014 | Artwohl et al. | |
| 2003/0087048 A1 * | 5/2003 | Chaussade | B64C 1/1492 428/34 |
| 2003/0117790 A1 | 6/2003 | Lee et al. | |
| 2003/0214619 A1 | 11/2003 | Masuda et al. | |
| 2004/0073334 A1 | 4/2004 | Terranova | |
| 2004/0160388 A1 | 8/2004 | O'Keeffe | |
| 2005/0068629 A1 | 3/2005 | Fernando et al. | |
| 2005/0172654 A1 | 8/2005 | Rohrer et al. | |
| 2006/0005484 A1 | 1/2006 | Riblier et al. | |
| 2006/0103269 A1 | 5/2006 | Artwohl et al. | |
| 2006/0192767 A1 | 8/2006 | Murakami | |
| 2007/0016478 A1 | 1/2007 | Hill | |
| 2007/0058114 A1 | 3/2007 | Niiyama et al. | |
| 2007/0171647 A1 | 7/2007 | Artwohl et al. | |
| 2007/0195535 A1 | 8/2007 | Artwohl et al. | |
| 2007/0216657 A1 | 9/2007 | Konicek | |
| 2008/0164788 A1 * | 7/2008 | Riblier | A47F 3/0434 312/116 |
| 2009/0036208 A1 | 2/2009 | Pennington et al. | |
| 2009/0121970 A1 | 5/2009 | Ozbek | |
| 2009/0146945 A1 | 6/2009 | Cho | |
| 2009/0295731 A1 | 12/2009 | Kim et al. | |
| 2009/0297806 A1 * | 12/2009 | Dawson-Elli | B32B 17/10036 428/213 |
| 2010/0013925 A1 | 1/2010 | Fowler et al. | |
| 2010/0026912 A1 | 2/2010 | Ho | |
| 2010/0043293 A1 | 2/2010 | Nicholson et al. | |
| 2010/0083672 A1 | 4/2010 | Yoon et al. | |
| 2010/0119705 A1 | 5/2010 | Roche et al. | |
| 2010/0152892 A1 | 6/2010 | Gavra et al. | |
| 2010/0275477 A1 | 11/2010 | Kim | |
| 2010/0293827 A1 | 11/2010 | Suss et al. | |
| 2011/0098849 A1 | 4/2011 | Hudis et al. | |
| 2011/0116231 A1 | 5/2011 | Dunn et al. | |
| 2011/0181792 A1 | 7/2011 | Hammonds | |
| 2011/0304252 A1 | 12/2011 | Stubblefield | |
| 2012/0105424 A1 | 5/2012 | Lee et al. | |
| 2012/0141699 A1 * | 6/2012 | Mader | E06B 3/66366 428/34 |
| 2012/0285089 A1 | 11/2012 | Artwohl et al. | |
| 2013/0015180 A1 | 1/2013 | Godard et al. | |
| 2013/0265232 A1 | 10/2013 | Yun et al. | |
| 2013/0271696 A1 | 10/2013 | Dunn | |
| 2013/0312459 A1 | 11/2013 | Coppola et al. | |
| 2014/0144083 A1 * | 5/2014 | Artwohl | A47F 3/0434 49/70 |
| 2014/0290156 A1 | 10/2014 | Bruce et al. | |
| 2015/0275567 A1 | 10/2015 | Jun | |

FOREIGN PATENT DOCUMENTS

| | | |
|---|---|---|
| WO | 2012157616 A1 | 11/2012 |
| WO | 14018838 | 1/2014 |
| WO | 2014181712 | 11/2014 |

OTHER PUBLICATIONS http://www.proudgreenhome.com/article/227025/Insulating-glass-delivers-lightweight-performance-for-energy-efficient-windows, downloaded Mar. 1, 2017.

https://www.lisec.com/machinery/stand-alone-machines/detail/insulating-glass-production/base-ig-manual.html, downloaded Mar. 1, 2017.

https://www.lisec.com/glass-processing/products/detail/glass-processing-1/besser-mit-duennglas.html, downloaded Mar. 1, 2017.

Corning Willow® Glass: Fact Sheet. "The future is flexible: Corning Willow Glass", 2016, 2 pgs.

Corning® Thin Sheet Glass Products, "Product Information", 2015, 2 pgs.

Corning Lotus™ NXT Glass, "Corning Lotus™ NXT glass for high-performance displays" 2015, 4 pgs.

Corning Eagle XG® Slim Glass, "Product Information Sheet", Aug. 2013, 2 pgs.

Machine Translation of JP2016574926 Office Action Dated Jul. 24, 2019, Japan Patent Office, 3 Pgs.

* cited by examiner

INSULATED GLASS UNIT

CROSS-REFERENCE TO RELATED APPLICATIONS

This application claims the benefit of priority under 35 U.S.C. § 365 of International Patent Application Serial No. PCT/US15/37976 filed on Jun. 26, 2015, which also claims the benefit of priority under 35 U.S.C. § 119 of U.S. Provisional Application Ser. No. 62/017,547 filed on Jun. 26, 2014, and U.S. Provisional Application Ser. No. 62/073,059 filed on Oct. 31, 2014 the content of which are relied upon and incorporated herein by reference in their entirety.

BACKGROUND OF THE INVENTION

The present disclosure relates generally to insulated glass units, and more particularly, to improved multiple pane insulated glass units that can be used in a display cooler door assembly.

Refrigerated display coolers are used in convenience stores, markets, food vending operations, and the like, to keep products, for example beverages and perishable food products, cool. Typically, such display coolers have a refrigerated compartment and an opening that is sealed by a door that can be opened by a consumer to retrieve the desired product.

Refrigerated display coolers consume a considerable amount of electricity during operation. It is therefore desirable to employ technologies that reduce the display cooler's electricity usage to save on operating costs, improve energy efficiency and reduce the $CO_2$ footprint (among others) of the cooler. One method of reducing the electricity usage is to make the refrigerated display cooler, itself, more thermally insulative. For example, more insulation could be added to the refrigerated compartment. However, the physical footprint of a display cooler is often constrained, and thicker insulation would mean reducing the total available storage space inside the cooler, thereby reducing the number of items for sale that can be stocked inside the cooler.

Another mechanism for improving thermal performance is to make the display cooler door more insulative. A typical display cooler door comprises a frame surrounding an insulated glass unit (IGU). An IGU typically comprises two or more sheets of glass sealed at their peripheral edges by a seal. The sheets of glass are spaced apart, and the space between each sheet of glass, once sealed, can be filled with an inert gas, such as argon or krypton. In doing so, the insulative or thermal performance of the display cooler door can be improved.

In addition to improving thermal performance, a display cooler door IGU that is more thermally insulative also needs to meet other design constraints. These constraints include: (1) minimized mass for stability purposes of the IGU and to reduce weight-based shipping costs; (2) maximized visible transmittance through the IGU so customers can see displayed products; (3) minimized door thickness to prevent storage space from being reduced (once the display door is closed) to maintain a constrained cooler footprint and to utilize existing hardware (for improved upgrade and cost control purposes for such potential retrofitting, among others); (4) robust mechanical design to prevent IGU breakage when the door is cycled during typical consumer interaction and usage thereof; and (5) minimized manufacturing cost, by using existing hardware, for example.

One way of improving the thermal performance of an IGU is to increase the number of glass panes from two to three. Although increasing the number of glass panes used in the IGU can improve the thermal performance of the IGU, conventional triple pane IGUs fail to meet the other design constraints, especially the weight and visibility constraints. Accordingly, a display cooler IGU that has improved thermal insulation properties and that can also satisfy the other design constraints is needed in the industry.

BRIEF SUMMARY OF THE INVENTION

At least one embodiment of the present technology provides an insulated glass unit (i.e., IGU) having at least first, and second glass panes, with at least one glass pane having a thickness of 1.5 mm or less, alternatively a thickness of 0.7 mm or less. In some embodiments, the glass panes have thicknesses that differ from one another.

In some embodiments, a third glass pane may be disposed between the first glass pane and the second glass pane. In some embodiments, an optional fourth glass pane may be utilized. For reference, as used herein, the first and second glass panes comprise the outermost glass panes and the third and/or fourth glass panes are disposed between the first glass pane and the second glass pane.

The third glass pane may optionally have a thickness of about 0.7 mm or less. The optional fourth glass pane may have a thickness of 1.5 mm or less or a thickness of 0.7 mm or less. The insulated glass unit further includes gap spaces defined between the glass panes. Where two glass panes are utilized, a first gap space is formed between the first glass pane and the second glass pane. Where three glass panes are utilized, the gap spaces (i.e., second gap space and third gap space) may be disposed between the first glass pane and the third glass pane and between the third glass pane and the second glass pane. Where four glass panes are utilized, the gap spaces may be disposed between the first and third glass panes, between the third and fourth glass panes, and between the fourth and second glass panes. The gap spaces may be filled with air or an insulating gas such as nitrogen or argon, among others, or a mixture thereof.

In some aspects, any one or more of the glass panes is strengthened, and any one or more of the glass panes may be coated with a low emissivity coating or other thermally insulative coating. In one or more embodiments, any one or more of the glass panes may form part of an electronic display (e.g., an LCD display), a portion of a back light unit (BLU), function as a waveguide or light guide plate (LGP), form a touch function surface, provide thermal insulation, provide rigidity and/or mechanical structural strength, and combinations thereof.

Another embodiment of the present technology is a display cooler door that comprises an insulated glass unit, and a frame at least partially surrounding the insulated glass unit. The insulated glass unit may include the two, three or four glass panes described herein.

Additional features and advantages will be set forth in the detailed description which follows, and in part will be readily apparent to those skilled in the art from that description or recognized by practicing the embodiments as described herein, including the detailed description which follows; the claims; as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION OF THE INVENTION

Figure 1:
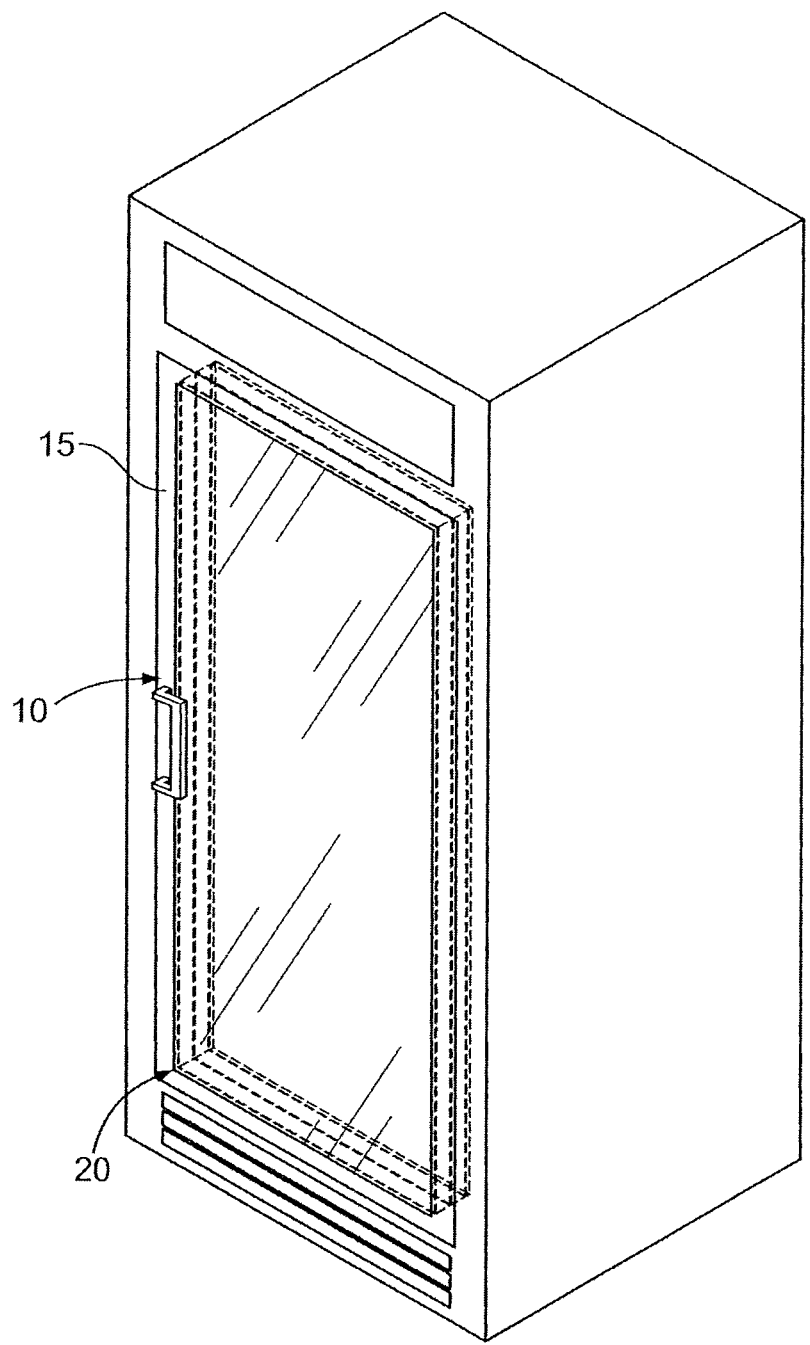
FIG. 1 is a perspective view of a display cooler door employing an insulated glass unit.

Reference will now be made in detail to various non-limiting embodiments of the present technology, examples of which are illustrated in the accompanying drawings. Whenever possible, the same reference numerals will be used throughout the drawings to refer to the same or like parts.

FIG. 1 provides an exemplary display cooler door 10 comprising a door frame 15 surrounding a triple pane insulated glass unit 20. The display cooler door 10 can be mounted to a frame which defines an opening in the display cooler. The display cooler door 10 can be swung or slid open or closed to alternately seal or unseal the interior space of the display cooler and allow access to items stored in the display cooler.

Figure 2:
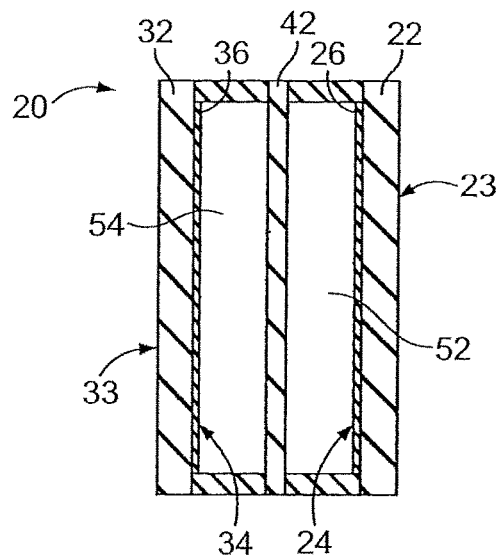
FIG. 2 is a side view of a triple pane insulated glass unit according to one or more embodiments.

The insulated glass unit 20 is illustrated in FIG. 2 and can, in some embodiments, comprise three glass panes 22, 32, and 42, respectively. In some embodiments, one of the three panes may be omitted, providing a double paned configuration. An outermost glass pane 22 can be positioned so that its outer surface 23 faces the ambient external environment or the "warm side" of the display cooler. An innermost glass pane 32 can be positioned so that its outer surface 33 faces the interior or "cold side" of the display cooler. A central pane 42 can be disposed between and spaced apart from the glass pane 22 and the glass pane 32. The central pane 42 can be positioned substantially parallel to the outer and inner glass panes 22, 32 or can be canted away from or towards the outer or inner glass panes 22, 32. Where only two glass panes are utilized, the central pane 42 may be omitted. It should be noted that while glass panes herein described may be referred to as transparent, some portion of all of each glass pane comprising an insulated glass unit can be semi-transparent, opaque, or semi-opaque. Thus, the characterization of a glass pane as in the described embodiments should not limit the scope of the claims appended herewith.

The outer and inner glass panes 22 and 32 can be, in some embodiments, "thick glass" panes. In some examples, one of the outer and inner glass panes 22 and 32 are "thick glass" panes. Alternatively, the third and/or the fourth glass panes, when utilized may be "thick glass" panes. "Thick glass", at least for some embodiments of the present technology, means a glass having a thickness in the range of about 1.7 mm to about 3.2 mm or more, and all sub-ranges therebetween. One example of thick glass is soda lime glass, although other types of glass could also be used in the practice of the present technology. Soda lime glass is typically manufactured using a float process known by those skilled in the art. In other embodiments, the outer glass pane 22 can be strengthened, e.g., by thermal tempering, chemical strengthening, or the like, to minimize the likelihood of breakage. Such strengthening processes are known to those of skill in the art. Of course, the inner glass pane 32 (or the third and/or fourth glass panes, where utilized) may also be strengthened.

In at least one embodiment of the present technology, the inner surface 24 of the outer glass pane 22 can be coated with a thermal coating, such as a low emissivity coating 26. Low emissivity coatings are known in the art and include, without limitation, sputter-coated and pyrolytic coatings that provide a high level of thermal performance and a high visible light transmittance. Such coatings can be formed from a variety of metals and/or metal oxides, including silver, titanium, and fluorine doped tin oxide. Suitable low emissivity coatings include, for example, silver and metal oxide coatings.

In at least one alternative embodiment of the presently described technology, the inner surface 34 of the inner glass pane 32 can also be coated with a low emissivity coating 36. The low emissivity coatings coated on the inner surfaces of the outer glass pane 22 and the inner glass pane 32 may be the same or different depending upon the desired properties and end use for the insulated glass unit. Combinations of coatings may also be used.

In some embodiments, the central glass pane 42 can be a "thin glass" pane. In some alternative embodiments, the outer and/or inner glass panes 22 and 32 may be "thin glass" panes. In some embodiments, at least one glass pane differs in thickness from the other glass panes. For example, in some embodiments at least one glass pane may be "thin glass" while the other glass panes are not thin glass. By "thin glass", for some embodiments of the present technology, is meant a glass that has a thickness of about 1.5 mm or less, alternatively less than 0.9 mm, alternatively less than 0.8 mm, alternatively about 0.7 mm or less, alternatively, in the range from about 0.1 mm to about 1.5 mm, alternatively in the range from about 0.1 mm to about 0.7 mm, and all sub-ranges therebetween. The thin glass panes can be made using a fusion process. Non-limiting exemplary compositions that may be used in such fusion-formed thin glass include aluminosilicate glass, alkali aluminosilicate glass, and boro-aluminosilicate glass. Commercially available examples of thin fusion-formed glass from Corning Incorporated include Corning® Willow® glass, Eagle XG® glass, Gorilla® Glass and Lotus® Glass. Exemplary embodiments may include thin fusion-formed glass having a thickness in the range from about 0.1 mm to about 1.5 mm. For instance, some embodiments may include fusion-formed glass having a thickness of about 0.1 mm, about 0.2 mm, or about 0.3 mm. In some embodiments, the thin fusion-formed glass may have a thickness of about 0.4 mm to about 0.7 mm. In some embodiments, the thin fusion-formed glass may have a thickness of about 1.5 mm or less (e.g., between about 0.4 mm to about 1.5 mm, less than 0.9 mm, less than 0.8 mm, less than about 0.7 mm, less than about 0.5, and all sub-ranges therebetween). It should be noted that while the glass panes have been referenced here as a single glass sheet, the claims appended herewith should not be so limited as the glass panes can be a glass laminate structure including a glass-polymer laminate structure or a glass-glass laminate structure. Suitable glass-polymer laminate structures include a single sheet of glass laminated to a polymeric film, two sheets of glass having an intermediate polymeric film, and the like. Suitable glass-glass laminate structures include a structure having an inner glass core and one or two outer glass clad layers. Exemplary glass-glass laminate structures and methods of making are described in co-owned U.S. Pat. No. 8,007,913, U.S. Patent Publication Nos., 2013/0015180 and 2013/312459, and International Publication No. WO14/018838, the entirety of each being incorporated herein by reference. The thin glass panes described herein could also be made from soda lime glass using a float process. The float process could be conducted in a manner to obtain a soda lime glass pane having a desired thickness of about 0.7 mm or less. Alternatively, a conventional soda lime glass pane having a thickness of about 1.7 to about 3.2 mm could be polished down to a desired thickness of about 0.7 mm or less.

In some embodiments, using thin glass for the central pane provides several advantages not provided by a conventional display cooler (i.e., IGU) product. For example, thin glass (or thin glass panes) provides a reduced mass and better visibility compared to a conventional triple pane insulated glass unit having a thicker central pane. Thin glass can also provide better thermal insulation compared to a conventional triple insulated glass unit requiring a constrained thickness. In addition, enclosing the thin central pane 42 between the thicker outer and inner panes 22 and 32, respectively, maintains a robust mechanical design that minimizes IGU breakage while providing enhanced thermal efficiency. In some embodiments, the outer and inner panes 22 and 32 may also include thin glass to further reduce weight and exhibit improved optical and strength requirements.

The central glass pane 42 and outermost glass pane 22 are spaced apart and can define a gap space 52 therebetween, and the central glass pane 42 and innermost glass pane 32 are spaced apart and define a gap space 54 therebetween. Both gap spaces are hermetically sealed by sealant assemblies known in the art. Such sealant assemblies can be formed from, for example, polymeric-based seals or other sealing material(s). The gap spaces can be filled with an inert gas to improve the thermal performance of the insulated glass unit. Suitable inert gases include, but are not limited to, argon, krypton and xenon. Also, mixtures of inert gases, or mixtures of one or more inert gases and air can be used. Suitable mixtures include a mixture of 90% argon and 10% air, alternatively, a mixture of 95% argon and 5% air, alternatively, a mixture of 95% krypton and 5% air, or alternatively, a mixture of 22% argon, 66% krypton and 12% air. Other ratios of inert gases, or inert gas and air, can also be used depending upon the desired thermal performance and end use of the insulated glass unit.

Figure 3:
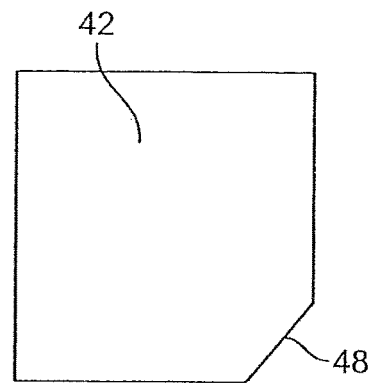
FIG. 3 is a front view of one embodiment of the central pane of the insulated glass unit.

It should be appreciated by those skilled in the art utilizing the presently described technology that the gas pressure in the gap space 52 can differ from the gas pressure in the gap space 54, in at least some embodiments. This could be due to a difference in the average gas temperature between the two spaces, since the gap space 52 is on the ambient, or warm, side of the insulated glass unit, while the gap space 54 is on the "cold" side, closer to the display cooler interior. The differential pressure could be sufficient to bow an exemplary thin central glass pane 42. To prevent bowing from occurring, at least one channel or opening in the central pane 42 can be provided to allow the gas in the gap space 52 to contact the gas in the gap space 54. Although it is possible to drill one or more holes in the central glass pane 42 to provide the gas communication between the gap spaces, such drilling can be difficult with a thin glass pane and can result in cracks or breakage. One convenient way to allow the gases to come into contact is to change the outer perimeter shape of the central pane, such as by clipping one or more corners of the central pane, as shown in FIG. 3. Changing the outer perimeter by removing or clipping a portion of the central pane results in a stronger central pane and less chance of cracks or breakage. When the central pane is sealed into the insulated glass unit, a clipped corner 48 can allow gas from the warm side gap space 52 to contact gas in the cold side gap space 54. This contact removes the potential for differential pressure between the gap spaces and thereby minimizes or eliminates bowing.

It should also be appreciated by those skilled in the art that the thickness of the gap spaces 52 and 54 can be varied and can range from about 8 mm to about 18 mm. In some embodiments, any one or more of the gap spaces 52 and 54 (or any other gap spaces) may have a thickness in the range from about 8 mm to about 12 mm, or about 10 mm. In some embodiments, the thickness of the gap spaces 52, 54 can be different. The total thickness of the insulated glass unit 20 can be about 40 mm or less, preferably about 36 mm or less, but can be at least about 26 mm. Desirable low U-values can be obtained when the gap spaces are in the range of about 14 mm to about 16 mm and the total thickness of the insulated glass unit is about 36 mm to about 40 mm. In some embodiments, for example where the footprint of the display cooler is constrained, the total thickness of the insulated glass unit can be about 26 mm to about 28 mm. A further benefit of having a thin glass central pane, especially for insulated glass units requiring a constrained thickness is that it allows for wider gap spaces. One drawback of constrained insulated glass units having narrow gap spaces is that there is a risk that contraction of the gasses in the gap spaces can cause the outer panes to bow and make contact with the central pane. This result is not only cosmetically unacceptable, it is unacceptable from an energy standpoint since it permits the direct conduction of heat into the cooler. Use of thinner glass panes allows for wider gaps and therefore reduces the risk of this problem.

Figure 4:
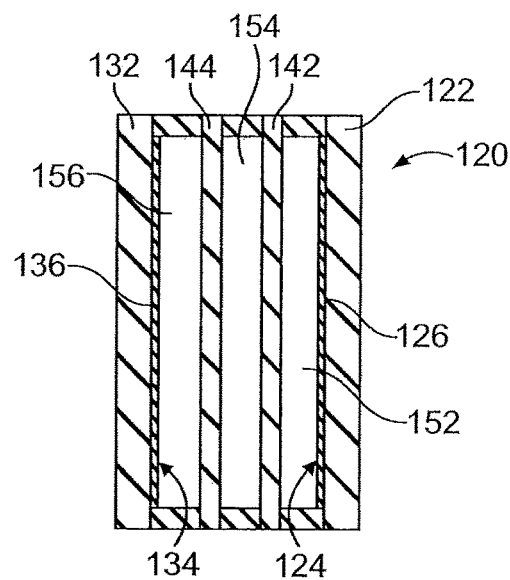
FIG. 4 is a side view of a four pane insulated glass unit according to one or more embodiments.

In a further aspect, at least one alternative insulated glass unit of the present technology is shown in FIG. 4. This embodiment is similar to the embodiment shown in FIG. 2 except that the insulated glass unit 120 comprises four glass panes instead of three: an outer glass pane 122, an inner glass pane 132, and two central glass panes 142 and 144 intermediate the outer glass pane 122 and the inner glass pane 132. In one example, the outer and inner glass panes 122 and 132 can be formed from thick glass, for example, soda lime glass, and each can have a thickness in the range of about 1.7 mm to about 3.2 mm. In another example, the central glass panes are thin glass, having a thickness in the range from about 0.1 mm to about 1.5 mm, alternatively, from about 0.1 mm to about 0.7 mm. Alternatively or additionally, any one or more of the outer and inner glass panes 122 and 132 can be formed from thin glass panes, as described herein. Alternatively or additionally, any one or more of the central glass panes may be thick glass panes.

In at least one embodiment, any one or more of the glass panes (e.g., 122, 132, 142, 144) can be strengthened by thermal tempering, chemical strengthening or another suitable strengthening process. The inner surface 124 of the outer pane 122 of this embodiment can be coated with a thermal coating, such as a low emissivity coating 126. In some embodiments, the inner surface 134 of the inner pane 132 may also be coated with a low emissivity coating 136. The low emissivity coatings selected for the inner surface 124 and the inner surface 134 may be the same or different. Combinations of coatings may also be used, depending upon the desired thermal performance and end use of the insulated glass unit. Suitable low emissivity coatings are described above in connection with the FIG. 2 embodiment.

Gap spaces 152, 154, and 156 are, respectively, defined between the outer glass pane 122 and the central glass pane 142, between the two central glass panes 142 and 144, and between the central glass pane 144 and the inner glass pane 132. Each of the gap spaces can be sealed with a sealing assembly, as known in the art, and filled with an inert gas, air, or a mixture of inert gas and air. Suitable inert gases include, for example, argon, krypton, and xenon.

To minimize or prevent the central glass panes from bowing, at least one channel or opening can be provided in each of the central panes 142 and 144 to allow contact between gases in the gap spaces, thereby removing the potential for differential pressures. In some embodiments, the channel is provided by changing the shape of the outer perimeter of the central panes, such as by clipping at least one corner of each of the central panes. The clipped corners can be the same corner for each central pane or can be different corners.

The thickness of the gap spaces 152, 154 and 156 can be varied and can range from about 7 mm to about 18 mm. In some embodiments, the thickness of the gap spaces 152, 154, and/or 156 can be different. The total thickness of the four pane embodiment of the insulated glass unit 120 is about 60 mm or less, preferably about 56 mm or less, but can be at least about 26 mm. Desirable low U-values can be obtained when the gap spaces are in the range of about 16 mm to about 18 mm and the total thickness of the insulated glass unit is about 54 mm to about 60 mm.

Figure 5:
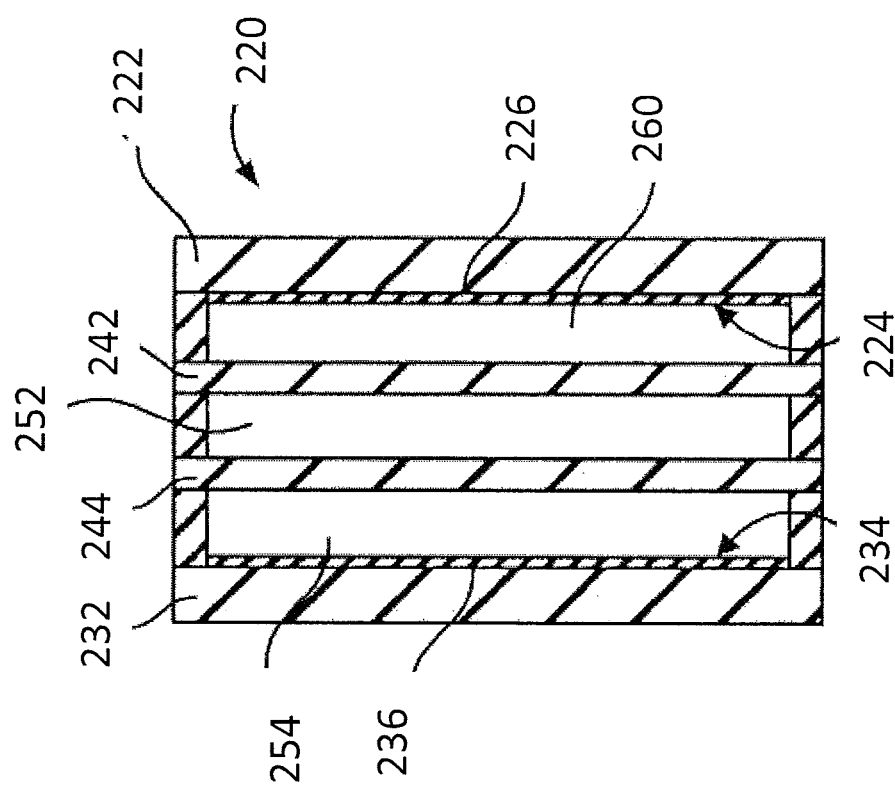
FIG. 5 is a side view of a four pane insulated glass unit according to one or more embodiments.

In one or more embodiments, any one or more of the glass panes may form part of a display (e.g., LCD display), provide thermal insulation, form a back light unit (BLU), form a touch-enabled surface and combinations thereof. FIG. 5 illustrates an embodiment that is similar to the embodiment shown in FIG. 4 except that the insulated glass unit 220 comprises four glass panes where at least one of the glass panes forms part of a display unit, and a touch-enabled surface. As shown in FIG. 5, the insulated glass unit 220 includes an outer glass pane 222, an inner glass pane 232, and two central glass panes 242 and 244 intermediate the outer glass pane 222 and the inner glass pane 232. Gap spaces 252 and 254 are, respectively, defined between the inner glass pane 222 and the central glass pane 244, and between the two central glass panes 244 and 242. Each of the gap spaces can be sealed with a sealing assembly, as known in the art, and filled with an inert gas, air, or a mixture of inert gas and air. Suitable inert gases include, for example, argon, krypton, and xenon.

In the embodiment shown, there is no gap space between central glass pane 242 and the outer glass pane 222 and, instead, the central glass pane 242 and the outer glass pane 222 form part of an LCD transparent display 260. In the embodiment shown, the outer glass pane 222 also includes a touch-enabled surface and may include a touch foil 226 or other structure providing touch functionality disposed on a surface thereof (e.g., inner surface 224). The inner glass pane 232 includes an inner surface 234, which may optionally include a coating (e.g., a low emissivity coating or other thermally insulative coating 136).

It should be noted that the inner glass pane 232 may form part of the LCD display and the touch-enabled surface. In one or more examples, the inner glass pane 232 and/or the outer glass pane 222 may be a thin glass pane as described herein, which may optionally be chemically strengthened. The central glass pane 244 may include a thin or thick glass pane, which may be optionally chemically strengthened. The central glass pane 244 may optionally include a thermally insulative coating. The central glass pane 242, which forms part of the LCD display 260 may provide a back light unit. In some examples, the central glass pane 242 may include a waveguide. The waveguide may be utilized to provide a backlight.

Figure 6:
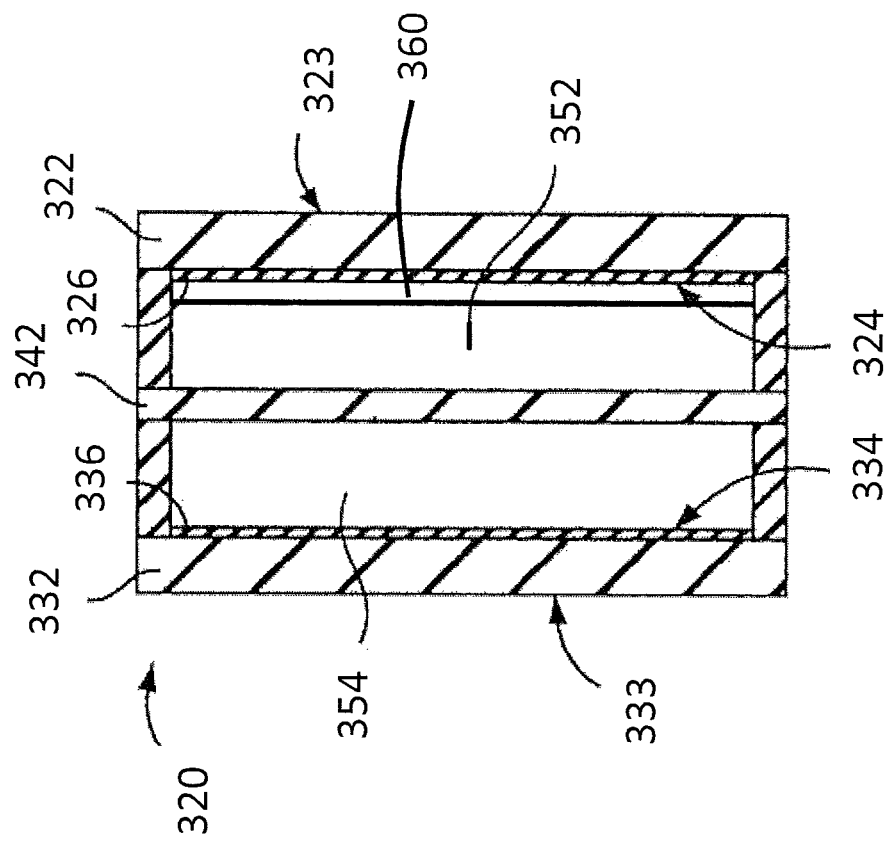
FIG. 6 is a side view of a triple pane insulated glass unit according to according to one or more embodiments.

FIG. 6 illustrates an embodiment that is similar to the embodiment shown in FIG. 1 except that the insulated glass unit 320 comprises an inner (cold) surface 333, an outer (warm) surface 323 and three glass panes where at least one of the glass panes forms part of a display unit, and a touch-enabled surface. As shown in FIG. 6, the insulated glass unit 320 includes an outer glass pane 322, an inner glass pane 332, and a central glass pane 342 intermediate the outer glass pane 322 and the inner glass pane 332. Gap spaces 352 and 354 are, respectively, defined between the inner glass pane 322 and the central glass pane 342, and between the central glass pane 342 and the outer glass pane 332. Each of the gap spaces can be sealed with a sealing assembly, as known in the art, and filled with an inert gas, air, or a mixture of inert gas and air. Suitable inert gases include, for example, argon, krypton, and xenon.

In the embodiment shown, there is a gap space 352 between central glass pane 344 and the outer glass pane 322, even though the outer glass pane 322 forms part of an LCD transparent display 360. It should be understood that while the embodiments illustrated have been shown with two or more gap spaces and including a display, the claims appended herewith should not be so limited as exemplary embodiments can include an IGU with a single gap and an electronic display. Accordingly, in some embodiments, a single gap space may be utilized, in combination with an electronic display. For example, in FIG. 6, the gap space 352 may be eliminated and only a single gap space (354) may be present, with central glass pane 344 and outer glass pane 322 forming at least part of an electronic display.

In the embodiment shown, the outer glass pane 322 also includes a touch-enabled surface and may include a touch foil 326 or other structure providing touch functionality disposed on a surface thereof (e.g., inner surface 324). The inner glass pane 332 includes an inner surface 334, which may optionally include a coating 336 (e.g., a low emissivity coating or other thermally insulative coating). It should be noted that the inner glass pane 332 may form part of the LCD display and the touch-enabled surface, instead of or in addition to the outer glass pane 322.

In one or more examples, the outer glass pane 322 may be a thin glass pane as described herein, which may optionally be chemically strengthened. The central glass pane 342 may include a thin or thick glass pane, which may be optionally chemically strengthened. The central glass pane 342 may optionally include a thermally insulative coating. The central glass pane 342 may form part of a back light unit. In some examples, the central glass pane 342 may include a waveguide. The waveguide may be utilized to provide a backlight.

EXAMPLES

Various embodiments will be clarified by the following non-limiting examples.

Example 1: Comparison of Triple Pane IGUs Containing Thin Glass to Triple Pane Soda Lime Glass IGUs In this example, triple pane insulated glass units having different modifications were compared for glass mass, visible transmittance, U-value, and heat removal properties. A three pane insulated glass unit containing three panes of soda lime glass, each 3.0 mm thick, is prepared as a base case or control for comparison. The outside (warm side) pane of the base case IGU can be tempered, and has a low emissivity coating on its inside surface. Exemplary low emissivity coatings include, but are not limited to, silver and/or metal oxide containing coatings commercially available from Royal Produits de batiment, Quanex Building Products, Deceuninck North America, Guardian Industries Corp., Cardinal Glass Industries, Inc., Pilkington North America, and Sage Electrochromics, Inc.

The gap spaces between the panes are each 8.5 mm thick and are filled with a mixture of 90% argon and 10% air. The dimensions of the base case IGU are 1461 mm high by 703 mm wide, with a total thickness of 26 mm. The base case IGU has the following properties:

| | |
|---|---|
| U factor (W/m$^2$K) | 1.34 |
| Glass mass (kg) | 23.1 kg |
| Visible transmittance (%) | 73% |

As comparison designs, triple pane IGUs are prepared using the same basic design as the base case IGU, except with the modifications described in the following Table 1.

TABLE 1

| Design | Modifications |
|---|---|
| Design 1 (SLG Low E coating1/SLG/SLG Low E coating1) | additional low emissivity (Low E) coating on the inside surface of the inner (cold side) pane, Low E coating has a visible light transmittance of between about 75 to about 82 percent, solar heat gain coefficient of about 0.69 to 0.72, U-factor of between about 0.25 to 0.34, UV transmission of between about 0.25 to 0.35, fading transmission of between about 0.60 to 0.68, gap spaces and total thickness are varied: total thickness varies from 26 mm to 60 mm, and the corresponding two evenly spaced gaps vary from (26-9)/2 = 8.5 mm to (60-9)/2 = 25.5 mm. |
| Design 1A (SLG Low E coating1/W/ SLG Low E coating1) | Same as Design 1, except 0.2 mm Corning ® Willow ® fusion glass is substituted for the center glass pane, and the gap spaces vary from (26-6.2)/2 = 9.9 mm to (60-6.2)/2 = 26.9 mm. |
| Design 2 (SLG Low E coating2/SLG/ SLG Low E coating2) | Low E coating on the inside surfaces of the outer (warm side) pane and the inner (cold side) pane, Low E coating has a visible light transmittance of between about 65 to about 76 percent, solar heat gain coefficient of about 0.25 to 0.35, U-factor of between about 0.24 to 0.34, UV transmission of between about 0.05 to 0.35, fading transmission of between about 0.40 to 0.50, gap spaces and total thickness are varied: total thickness varies from 26 mm to 60 mm, and the corresponding two evenly spaced gaps vary from (26-9)/2 = 8.5 mm to (60-9)/2 = 25.5 mm. |
| Design 2A (SLG Low E coating2/W/ SLG Low E coating2) | Same as Design 2, except 0.2 mm Corning ® Willow ® fusion glass is substituted for the center glass pane and the gap spaces vary from (26-6.2)/2 = 9.9 mm to (60-6.2)/2 = 26.9 mm. |
| Design 3 (SLG Low E coating1/SLG/SLG/SLG Low E coating1) | additional Low E coating on the inside surface of the inner (cold side) pane, characteristics of Low E coating are similar to those in Designs 1 and 1A, fourth pane of soda lime glass added as additional center pane, gap spaces and total thickness are varied: total thickness varies from 26 mm to 68 mm, and the corresponding three evenly spaced gaps vary from (26-12)/3 = 4.7 mm to (68-12)/3 = 18.7 mm. |
| Design 3A (SLG Low E coating1/W/W/ SLG Low E coating1) | Same as Design 3, except 0.2 mm Corning ® Willow ® fusion glass is substituted for both central panes and the gap spaces vary from (26-6.4)/3 = 6.5 mm to (68-6.4)/3 = 20.5 mm. |

Note:
SLG—represents soda lime glass
W— represents Willow ® glass

Figure 7:
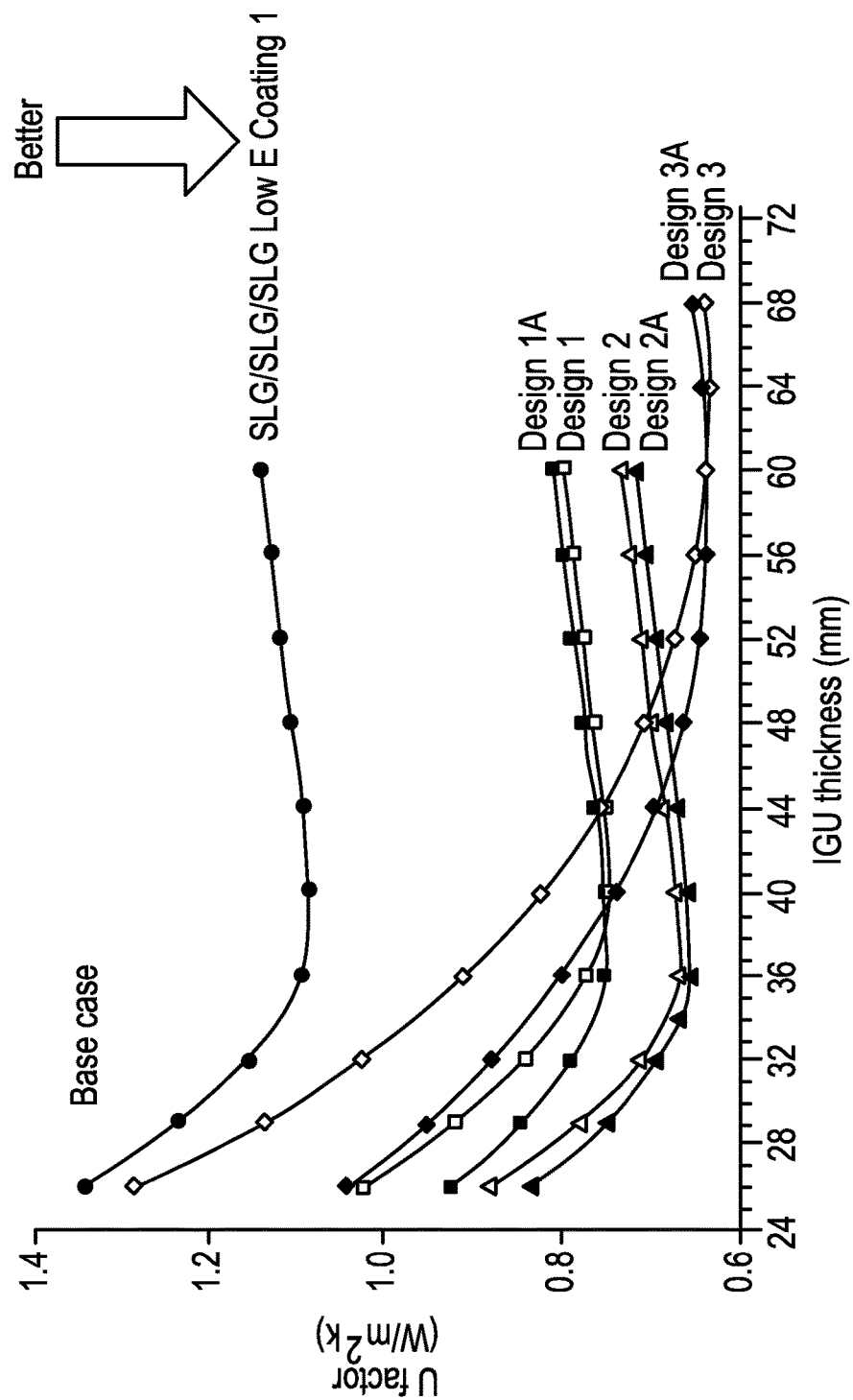
FIG. 7 is a graph illustrating U-values of different insulated glass units.
Figure 8:
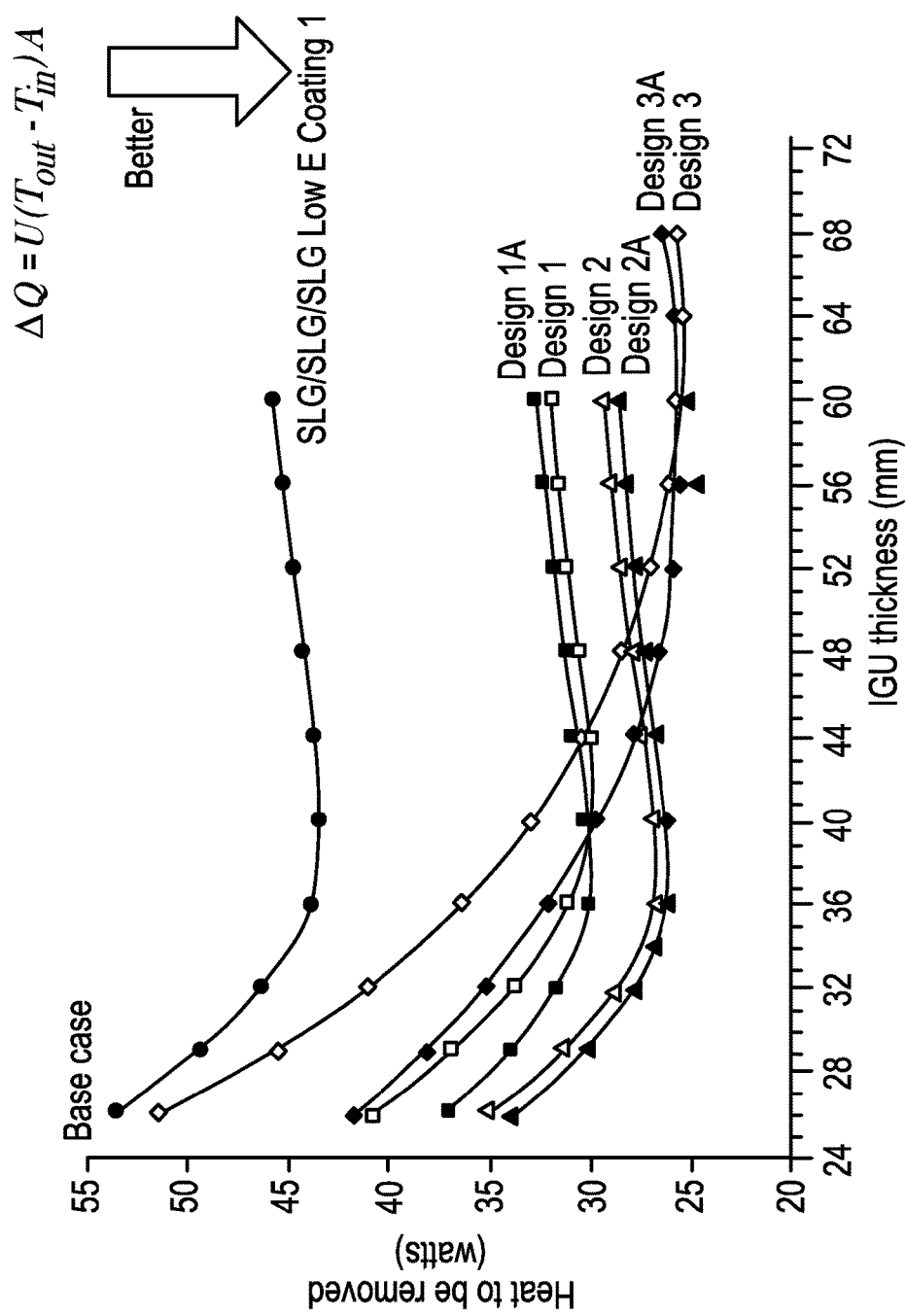
FIG. 8 is a graph illustrating heat removal requirements for different insulated glass units.

The glass mass and visibility transmittance properties of the base case IGU and the different design IGUs are shown below in Table 2. Comparisons of the U-values and heat removal requirements of the different designs are illustrated in FIGS. 7 and 8, respectively.

TABLE 2

| | Mass (kg) | Visibility transmittance (%) |
|---|---|---|
| Base IGU | 23.1 kg | 73% |
| Design 1 | 23.1 kg | 70% |
| Design 1A | 15.9 kg | 71% |
| Design 2 | 23.1 kg | 47% |
| Design 2A | 15.9 kg | 47% |
| Design 3 | 30.8 kg | 64% |
| Design 3A | 16.4 kg | 66% |

Comparing the properties of Design 1A, prepared in accordance with the present technology, with those of Design 1, Design 1A has 31% less glass mass (15.9 kg vs. 23.1 kg) and 1% better visibility transmittance (71% vs. 70%) than Design 1. Design 1A also has a lower U-value than Design 1 for all IGU thicknesses under 39 mm, as shown in FIG. 7. It should be appreciated by those skilled in the art that a lower U-value (as unexpectedly achieved by the present technology) leads to less heat having to be removed from the display cooler, as shown in FIG. 8.

As shown in FIG. 7, the lowest U-value for Design 1A occurs when the IGU has a total thickness of about 36 mm. Compared against the base case IGU, Design 1A, at a thickness of 36 mm, provides an advantageous and significant heat removal savings (up to 44%, see FIG. 8) and glass mass savings (31%), at a tradeoff of a very modest 3% less visibility transmittance but at a larger thickness (36 mm vs. 26 mm).

Comparing the properties of Design 2A, prepared in accordance with the present technology, with those of Design 2, Design 2A has 31% less glass mass (15.9 kg vs. 23.1 kg) and essentially the same visibility transmittance as Design 2. Design 2A also has a lower U-value than Design 2 for all IGU thicknesses, as shown in FIG. 7, resulting in an unexpected and improved heat removal savings (see FIG. 6). As shown in FIG. 7, the lowest U-value for Design 2A occurs at a total thickness of about 36 mm. Compared against the base case IGU, Design 2A, at a thickness of 36 mm, provides advantageously a significant heat removal savings (up to 52%, see FIG. 8) and glass mass savings (29%), but at a tradeoff of 36% less visibility transmittance and larger IGU thickness (36 mm vs. 26 mm).

Comparing the properties of Design 3A, prepared in accordance with the present technology, with those of Design 3, Design 3A has 47% less glass mass and 3% less visibility transmittance than Design 3. Design 3A also has a lower U-value than Design 3 for all IGU thicknesses less than 60 mm (see FIG. 7), resulting in unexpectedly improved heat removal savings (see FIG. 8). As shown in FIG. 7, the lowest U-value for Design 3A occurs at a total thickness of 56 mm. Compared against the base case IGU, Design 3A, at a thickness of 56 mm, provides the advantage of significant heat removal savings (up to 52%) and glass mass savings (29%), at a tradeoff of a modest 10% less visibility transmittance, but at a larger IGU thickness (56 mm vs. 26 mm).

Example 2: Comparison of Triple Pane IGUs Containing Thin Glass to Triple Pane Soda Lime Glass IGUs at Constrained Thickness In this example, triple pane cooler door IGUs having a required thickness of 28 mm were compared for glass mass, visibility transmittance and heat infiltration. As the base case for the comparison, a triple pane insulated glass unit is prepared and has three panes of soda lime glass, each 3.0 mm thick. The outside (warm side) pane is tempered and has an exemplary low emissivity coating on its inside surface. The gap spaces between the panes are each 9.5 mm thick and are filled with air. The dimensions of the base case IGU are 1461 mm high by 703 mm wide, with a total thickness of 28 mm.

As the experimental embodiments, triple pane insulated glass units are prepared using the same basic design as the base case IGU except with the following design modifications: an exemplary low emissivity coating (see Design 1) is added on the inside surface of the inner (cold side) pane; the gap spaces are filled with a mixture of 90% argon and 10% air; and the center soda lime glass pane is replaced with thin fusion glass; for embodiment A, the thickness of the fusion glass is 0.5 mm and the gap spaces are each 10.75 mm; for embodiment B, the thickness of the fusion glass is 1.0 mm and the gap spaces are each 10.5 mm.

The properties of the base case and experimental embodiment A are shown in Table 3.

TABLE 3

|  | U-Factor (W/m$^2$K) | Glass Mass (lb.) | Visibility Transmittance |
|---|---|---|---|
| Base Case IGU | 1.54 | 50.6 | 72.6% |
| Embodiment A | 0.89 | 36.7 | 70.7% |
| % Difference | 42% less | 28% less | 3% Darker |

The experimental embodiment A provides unexpectedly a 42% improvement on heat infiltration and a 28% improvement on glass mass, while losing approximately about 3% in visible transmittance compared to the base case IGU, as shown in Table 3. The experimental embodiment B provides similar advantageous improvements: 41% improvement on heat infiltration and a 22% improvement on glass mass, and approximately about 3% loss in visibility transmittance compared to the base case IGU.

It will be apparent to those skilled in the art that various modifications and variations can be made without departing from the spirit and scope of the invention, which is defined by the appended claims.

The invention claimed is:

1. An insulated glass unit comprising:
a first glass pane having an outer surface and an inner surface;
a second glass pane having an outer surface and an inner surface;
a third glass pane disposed between the first and second glass panes;
a first sealed gap space defined between the first glass pane and the third glass pane; and
a second sealed gap space defined between the second glass pane and the third glass pane;
wherein the third glass pane has a thickness ranging from 0.1 mm to 0.4 mm.

2. The insulated glass unit of claim 1, wherein the inner surface of the first glass pane is coated with at least one low emissivity coating or a mixture of coatings.

3. The insulated glass unit of claim 1, wherein any one or more of the first glass pane, second glass pane, and the third glass pane are strengthened.

4. The insulated glass unit of claim 1, wherein the inner surface of the second glass pane is coated with at least one low emissivity coating.

5. The insulated glass unit of claim 1, wherein the first sealed gap space is filled with at least one insulating glass or a mixture thereof.

6. The insulated glass unit of claim 1, wherein the second sealed gap space is filled with at least one insulating gas or a mixture thereof.

7. The insulated glass unit of claim 6, wherein the gas in the second sealed gap space communicates with the gas in the first sealed gap space through at least one channel or opening in the third glass pane.

8. The insulated glass unit of claim 7, wherein the channel or opening is a clipped corner of the third glass pane.

9. The insulated glass unit of claim 1, further comprising a fourth glass pane intermediate the first and second glass panes, the fourth glass pane having a thickness less than or equal to 0.7 mm.

10. The insulated glass unit of claim 1, wherein any one or more of the first glass pane, the second glass pane and the third glass pane comprises any one or more of: an electronic display, a back light unit (BLU), a waveguide, a light guide plate (LG), and a touch function surface.

11. A display cooler door comprising:
the insulated glass unit of claim 1; and
a frame at least partially surrounding the insulated glass unit.

12. The display cooler door of claim 11, wherein any one or more of the first glass pane, the second glass pane, and the third glass pane has a surface coated with one or more thermal coatings.

13. The display cooler door of claim 11, wherein any one or more of the first glass pane, the second glass pane, and the third glass pane is strengthened.

14. The display cooler door of claim 11, wherein any one or more of the first glass pane, the second glass pane and the third glass pane comprises any one or more of: an electronic display, a back light unit (BLU), a waveguide, a light guide plate (LG), and a touch function surface.

15. An insulated glass unit comprising:
a first glass pane;
a second glass pane;
a third glass pane intermediate the first and second glass panes;
a first sealed gap space defined between the first glass pane and the third glass pane; and
a second sealed gap space defined between the second glass pane and the third glass pane,
wherein any one or more of the first glass pane and the second glass pane has a thickness less than or equal to 0.7 mm, and
wherein the third glass pane has a thickness ranging from 0.1 mm to 0.4 mm.

16. The insulated glass unit of claim 15, wherein the third glass pane comprises a boro-aluminosilicate glass.

17. The insulated glass unit of claim 15, wherein the third glass pane has a coefficient of thermal expansion (CTE) ranging from $30\text{-}35 \times 10^{-7}/°$ C.

* * * * *

UNITED STATES PATENT AND TRADEMARK OFFICE
CERTIFICATE OF CORRECTION

PATENT NO. : 10,448,753 B2
APPLICATION NO. : 15/318495
DATED : October 22, 2019
INVENTOR(S) : Kirk Wegner Christiansen et al.

Page 1 of 1

It is certified that error appears in the above-identified patent and that said Letters Patent is hereby corrected as shown below:

On the Title Page

Column 2, item (56), other publications, Line 2, delete "Daylight" and insert -- Daylighting --, therefor.

Signed and Sealed this
Eleventh Day of February, 2020

Andrei Iancu
*Director of the United States Patent and Trademark Office*